Sept. 2, 1924.                                    1,506,741
R. EHRENFELD ET AL
LUBRICATING DEVICE
Filed May 14, 1921

WITNESSES:

INVENTORS
Ralph Ehrenfeld and
Andrew A. Kucher
BY
ATTORNEY

Patented Sept. 2, 1924.

1,506,741

UNITED STATES PATENT OFFICE.

RALPH EHRENFELD, OF EAST PITTSBURGH, PENNSYLVANIA, AND ANDREW A. KUCHER, OF JERSEY CITY, NEW JERSEY, ASSIGNORS TO WESTINGHOUSE ELECTRIC & MANUFACTURING COMPANY, A CORPORATION OF PENNSYLVANIA.

LUBRICATING DEVICE.

Application filed May 14, 1921. Serial No. 469,446.

*To all whom it may concern:*

Be it known that we, RALPH EHRENFELD, a citizen of the United States, and a resident of East Pittsburgh, in the county of Allegheny and State of Pennsylvania, and ANDREW A. KUCHER, a citizen of the United States, and a resident of Jersey City, in the county of Hudson and State of New Jersey, have invented a new and useful Improvement in Lubricating Devices, of which the following is a specification.

Our invention relates to lubricating devices and it has particular relation to the means whereby the lubricant is supplied to the reservoir thereof.

The object of our invention is to provide a simple and inexpensive device whereby lubricant may be supplied to the reservoir provided therefor and whereby the passageway to said reservoir is effectually sealed against the admission of foreign matter when the reservoir is not being filled.

Another object of our invention is to provide a device which will avoid the possibility of flooding the associated bearing or the reservoir.

Heretofore, it has been customary to introduce lubricant into reservoirs or bearings and the like by means of oil cups, the covers of which are hinged thereto. When it is desired to supply lubricant to the reservoir, the lid of the oil cup is raised and the oil is poured thereinto. No means are provided whereby the danger of flooding the reservoir is avoided, unless such means be entirely separate from the oil cup and it must then be provided with a separate cover, which must be removed before introducing oil into the reservoir.

By our invention, we provide a device which, when disposed in one position, permits lubricant to enter the reservoir and prevents flooding thereof, and, when in another position, closes all the passageways by which the lubricant may enter or leave the reservoir, thus preventing the admission of foreign matter thereto.

In the accompanying drawings.

Figure 1:
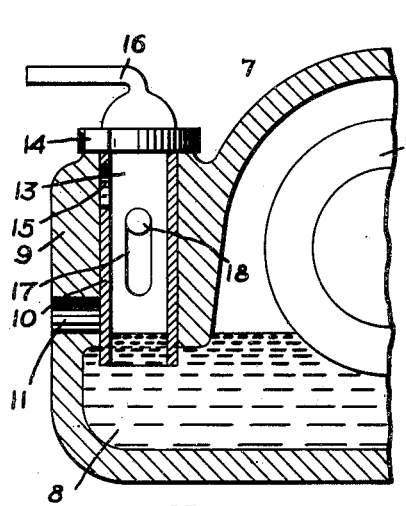
Figure 1 is a cross-sectional view illustrating a portion of a bearing housing provided with a lubricant-supplying device constructed in accordance with our invention. In this figure, the device is in its normal or operation position.

In the drawings, we show a bearing member 6 enclosed within a housing 7 which is provided with a reservoir 8 adapted to contain a liquid lubricant for such bearing.

The housing 7 is provided with an offset portion 9 which, in turn, is provided with a vertically-extending passageway 10 which communicates, at one end, with the outside atmosphere, and, at the other end, with the reservoir 8. An overflow passage 11, which is also provided in the portion 9, communicates, at one end, with the outside atmosphere and, at the other end, with the passageway 10. The overflow passage 11 is disposed adjacent to the lower end of the passageway 10. Disposed within the passageway 10 is a tube 13, the upper end of which is closed by means of a cap 14 and the lower end of which opens into the lubricant reservoir 8. The tube 13 is provided with an opening 15 in the wall thereof adjacent to its upper end.

The cap 14 is provided with a handle 16 by means of which the tube may be raised or lowered within the passageway 10. The tube is also provided with a longitudinally extending slot 17 to receive a pin 18 with which the housing portion 9 is provided. The pin-and-slot connections 17 and 18 determine the extent to which the tube 13 may be moved by means of the handle 16.

Figure 2:
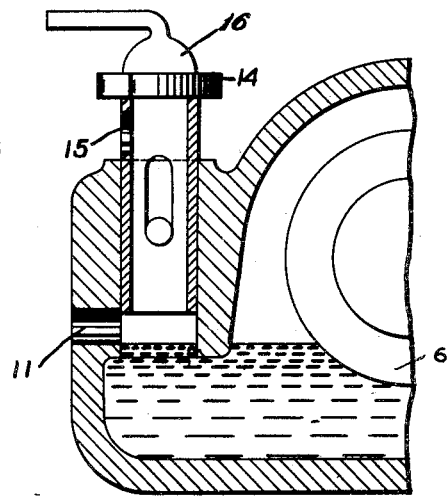
Fig. 2 is a view similar to Fig. 1 but having the lubricant-supplying device in its raised or filling position.

It will be observed that, when the tube 13 is in its upper or raised position, as illustrated in Fig. 2, lubricant may be supplied thereto through the opening 15. The lubricant will pass through the tube 13 and will flow from the bottom thereof into the reservoir 8. When the reservoir is filled, any lubricant thereafter supplied will flow out through the overflow passage 11. So long as the tube is in such position that the lubricant may be supplied thereto, the overflow passage 11 will be unobstructed, whereby the possibility of flooding the bearing is avoided.

When the tube is in its lowermost or normal operating position, the opening 15 is closed by the wall of the passageway 10, and the overflow passage 11 is closed by the lowermost portion of the tube 13, thus sealing the reservoir 8 from the outside atmosphere and preventing the admission of foreign material.

Figure 3:
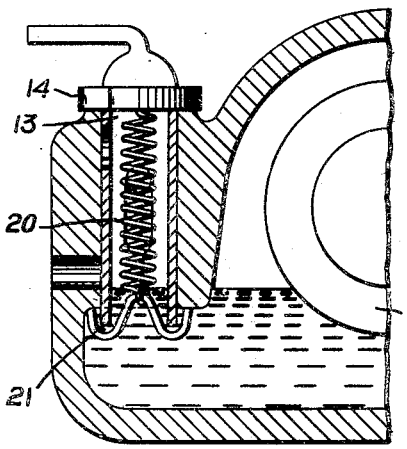
Fig. 3 is a view similar to Fig. 1 but having, in addition thereto, means for holding the lubricant-supplying device in its normal position.
Figure 4:
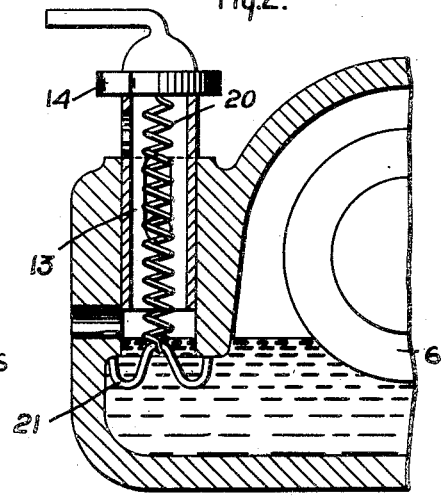
Fig. 4 is a view similar to Fig. 3, with the lubricant-supplying device in its raised position.

In the structure shown in Figs. 3 and 4, we employ a tension spring 20 attached, at one end, to the cap member 14 and, at its other end, to a resilient member 21 which engages the lower end of the housing portion 9. The spring 20 tends to hold the tube 13 in its lowermost or operating position. In Fig. 4, the spring is shown in its extended position which it will assume when the tube 13 is raised to the position in which lubricant may be introduced.

Figure 5:
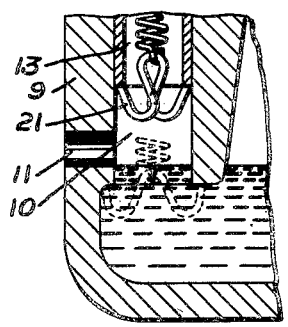
Fig. 5 is a view illustrating the manner in which a device constructed in accordance with our invention may be assembled.

In Fig. 5, is illustrated the method by which the tube 13 is utilized in assembling the device, the resilient member 21 being compressed so as to pass into the passageway 10. The ends of the resilient member 21 engage the end of the tube 13 in such manner that, when the tube is moved downwardly into position, the member 21 is forced downwardly thereby. When the tube 13 passes the end of the passageway 10, the member 21, no longer being confined, expands outwardly to its normal position and engages the lower end of the housing portion 9, thus preventing the tube 13 from being withdrawn entirely from the passageway and tending to hold it in its normal or closed position.

While we have shown only two embodiments of our invention, further changes and modifications may be made therein without departing from the spirit thereof, and we desire, therefore, that only such limitations shall be placed thereupon as are imposed by the prior art or are specifically set forth in the appended claims.

We claim as our invention:

1. In combination, a housing having a reservoir therein provided with a substantially vertical passageway through one wall thereof, said housing being also provided with an overflow passage communicating with said passageway extending laterally through one of the side walls thereof and opening into the outside atmosphere, and a hollow member adapted to move longitudinally within said passageway and close said passageway and overflow passage when in one position and to open said overflow passage and permit the introduction of liquid into said passageway when in another position.

2. In combination, a housing containing a reservoir and provided with a passageway through one wall thereof, said housing being also provided with an overflow passage communicating with said passageway and with the exterior of the housing, and a manually movable tube disposed within said passageway and provided with an opening intermediate its ends, the opening in the wall of the tube being closed by the wall of the passageway into the housing and the overflow passage in the wall of the passageway being closed by the tube when said tube is in one position, and said openings and overflow passage being open when said tube is in another position.

3. In combination, a bearing housing provided with a substantially vertically extending passageway extending through the wall thereof, said housing being provided with an overflow passage communicating with the exterior of the housing and with said passageway, and a tube slidably mounted in said passageway and provided with an opening thereinto intermediate its ends, said opening in the tube being closed by the wall of the passageway and the overflow passage in the passageway being closed by the tube when said tube is in its normal position, and said opening and overflow passage being unobstructed when said tube is moved to a predetermined position.

4. In combination, a bearing housing provided with a substantially vertically extending passageway extending through the wall thereof, said housing being provided with an overflow passage communicating with the exterior of the housing and with said passageway, a tube slidably mounted in said passageway and provided with an opening thereinto disposed intermediate its ends, said opening in the tube being closed by the wall of the passageway and the overflow passage being closed by the tube when said tube is in its normal position, and said opening and overflow passage being unobstructed when said tube is moved to a predetermined position, and a spring adapted to retain said tube in its normal position.

5. In combination, a bearing housing provided with a substantially vertically extending passageway extendng through the wall thereof, and a tube havng one end thereof closed slidably disposed within said passageway, said tube being provided with an opening disposed intermediate its ends, that is closed when said tube is in its normal position and is in communication with the interior of said housing when said tube is actuated to a predetermined position.

6. In combination, a bearing housing provided with a substantially vertically extending passageway extending through the wall thereof, a tube, having one end thereof closed slidably disposed within said passageway, said tube being provided with an opening intermediate its ends that is closed when said tube is in its normal position and is in communication with the interior of said housing when moved to a predetermined position, and a handle whereby said tube may be moved manually.

7. In combination, a bearing housing provided with a substantially vertically extending passageway extending through the wall thereof, a tube, having one end thereof closed slidably disposed within said passageway, said tube being provided with an opening intermediate its ends that is closed when said tube is in its normal position and is in communication with the interior of said housing when moved to a predetermined position, a handle whereby said tube may be moved manually, and a spring tending to maintain said tube in its normal position.

In testimony whereof, we have hereunto subscribed our names this 28th day of April, 1921.

RALPH EHRENFELD.
ANDREW A. KUCHER.